United States Patent
Espinosa

(10) Patent No.: US 7,201,170 B2
(45) Date of Patent: Apr. 10, 2007

(54) SUPPORT STRUCTURE FOR ADULT DEVICES

(76) Inventor: Greg Espinosa, 35275 Singleton Rd., Calimesa, CA (US) 92320

( * ) Notice: Subject to any disclaimer, the term of this patent is extended or adjusted under 35 U.S.C. 154(b) by 0 days.

(21) Appl. No.: 10/336,206

(22) Filed: Jan. 3, 2003

(65) Prior Publication Data

US 2004/0129274 A1 Jul. 8, 2004

(51) Int. Cl.
*A61G 15/00* (2006.01)
(52) U.S. Cl. ......................... 128/845; 600/38
(58) Field of Classification Search ............... 128/845, 128/846, 870; 600/38; 5/633, 634, 610, 5/615, 651; 606/244; 297/377
See application file for complete search history.

(56) References Cited

U.S. PATENT DOCUMENTS

| | | | | |
|---|---|---|---|---|
| 3,057,348 A | * | 10/1962 | Baer | 601/46 |
| 3,276,817 A | * | 10/1966 | Marple | |
| 3,557,791 A | * | 1/1971 | Duffy | 128/845 |
| 4,054,282 A | * | 10/1977 | Hamer | 5/610 |
| 4,732,140 A | * | 3/1988 | Stoffregen | 601/71 |
| 5,416,939 A | * | 5/1995 | Maalouli | 5/610 |
| 5,851,175 A | * | 12/1998 | Nickell | 600/38 |
| 6,203,491 B1 | * | 3/2001 | Uribe | 600/38 |

* cited by examiner

*Primary Examiner*—Michael A. Brown
(74) *Attorney, Agent, or Firm*—Steins & Associates, P.C

(57) ABSTRACT

A Support Structure for Adult Devices is disclosed. The device provides a flat, adjustably inclinable surfaces to which adult novelty devices may be attached. The device may include a hinged junction between a pair of flat members to provide the inclinability. The device further has one or more struts extending between the flat members to set the device at a particular incline angle. Still further, the device may have non-skid strips on its underside to prevent slippage on smooth surfaces.

12 Claims, 5 Drawing Sheets

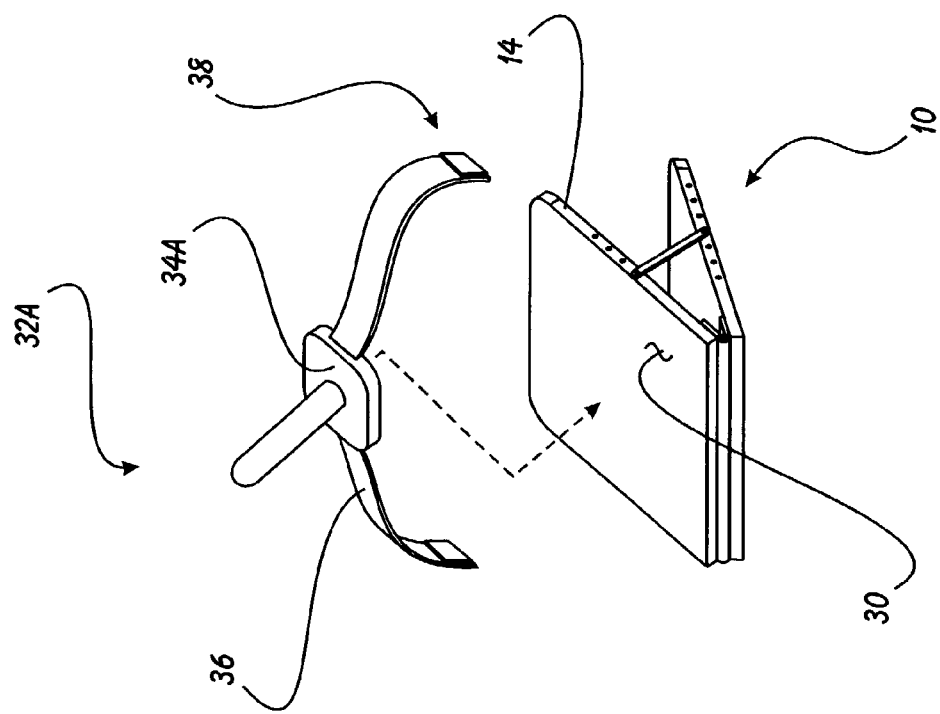
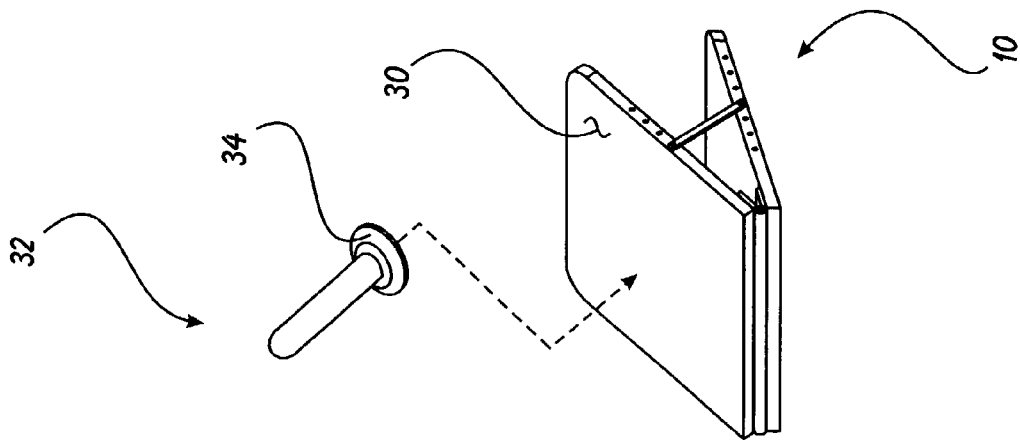
FIGURE 2B
FIGURE 2A

SUPPORT STRUCTURE FOR ADULT DEVICES

BACKGROUND OF THE INVENTION

1. Field of the Invention

This invention relates generally to adult entertainment and, more specifically, to a Support Structure for Adult Devices 2. Description of Related Art The adult sexual device market is expanding rapidly. There are a multitude of varieties of devices available for persons interested in such things. While many of these items are designed to be used by a lone individual, none of them really provide adequate support versatility to truly optimize their use. As one individual once said: "Have you ever tried to tickle yourself?" What is needed is a portable support structure for adult sexual devices that provides for a wide range of support options for the sexual device.

SUMMARY OF THE INVENTION

In light of the aforementioned problems associated with the prior devices, it is an object of the present invention to provide a Support Structure for Adult Devices. The device should provide a flat, adjustably inclinable surfaces to which adult novelty devices may be attached. The device may include a hinged junction between a pair of flat members to provide the inclinability. The device should further have one or more struts extending between the flat members to set the device at a particular incline angle. Still further, the device may have non-skid strips on its underside to prevent slippage on smooth surfaces.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

FIGS. 2A and 2B depict how conventional sexual devices might attach to the device of the present invention;

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a Support Structure for Adult Devices.

Figure 1:
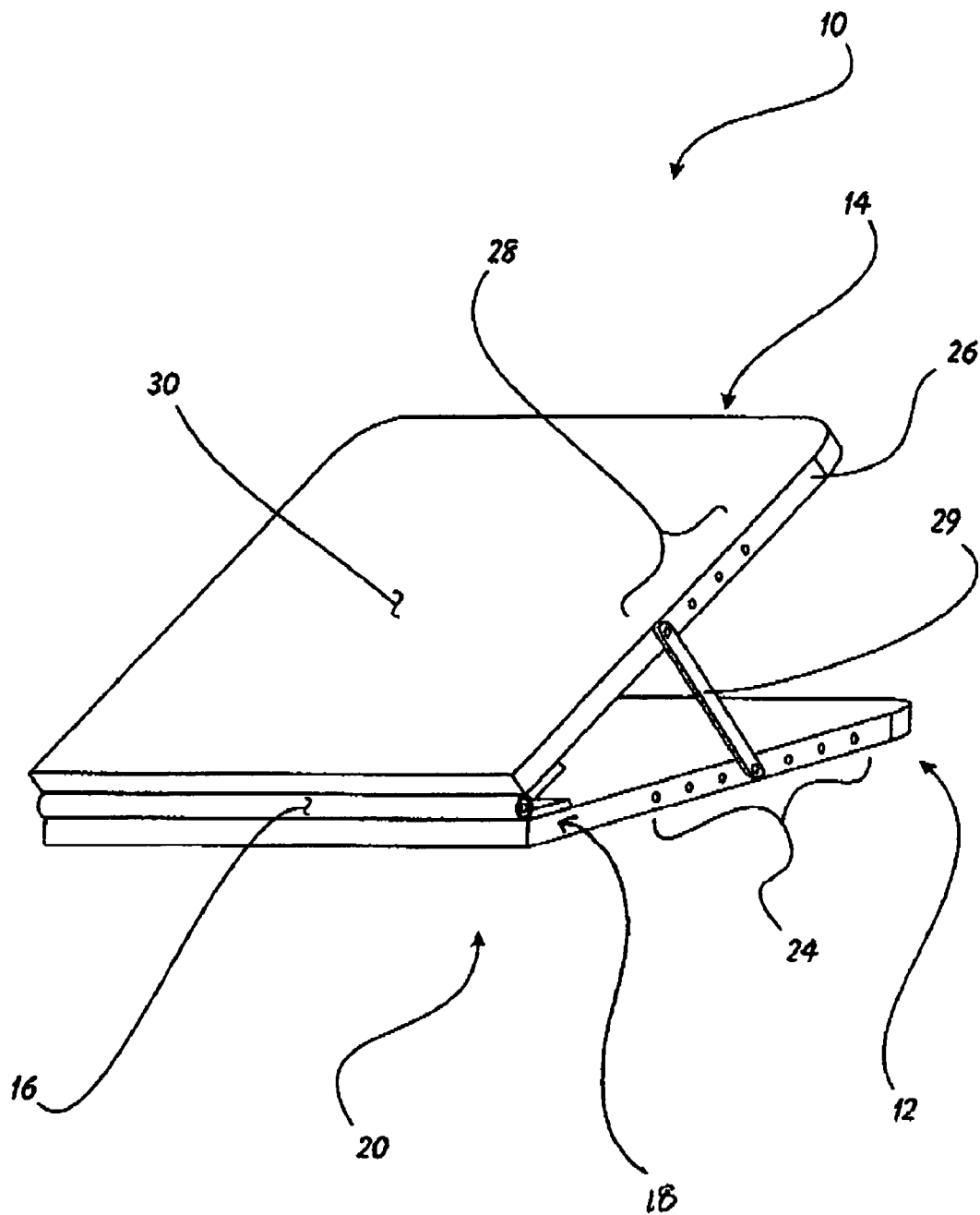
FIG. 1 is a perspective view of one embodiment of the sexual device support structure of the present invention.

The present invention can best be understood by initial consideration of FIG. 1. FIG. 1 is a perspective view of one embodiment of the sexual device support structure 10 of the present invention. The device can be constructed from a variety of materials and in a variety of shapes and sizes, so the embodiments shown should not be interpreted as being limited in these and other areas. In particular, the members may be constructed from wood, marble, fiberglass, or other conventionally available materials of construction.

The structure 10 comprises a first member 12 and a second member 14 that are interconnected by hinge means 16 for permitting the first and second members 12 and 14 to angularly adjust relative to one another. The hinge means 16 may comprise a conventional hinge, as shown, or it might be some other conventional design.

The first member 12 is further defined by a an edge 18 having one or more inclination selection apertures 24 disposed therealong. The second member 14 is also defined by an edge 26, and is further defined by a first inclinable surface 30. The edge 26 also has one or more inclination selection apertures 28 disposed therealong. These apertures 24 and 28 might, in alternate embodiments, consist of pegs or other devices for attaching the strut 29 to. It should be intuitively apparent that the strut 29 and apertures 24 and 28 cooperate to enable the second member 14 to be positioned in a variety of angular positions relative to the first member 12. Now turning to FIGS. 2A and 2B, we can examine the operation of the present invention.

Figure 3:
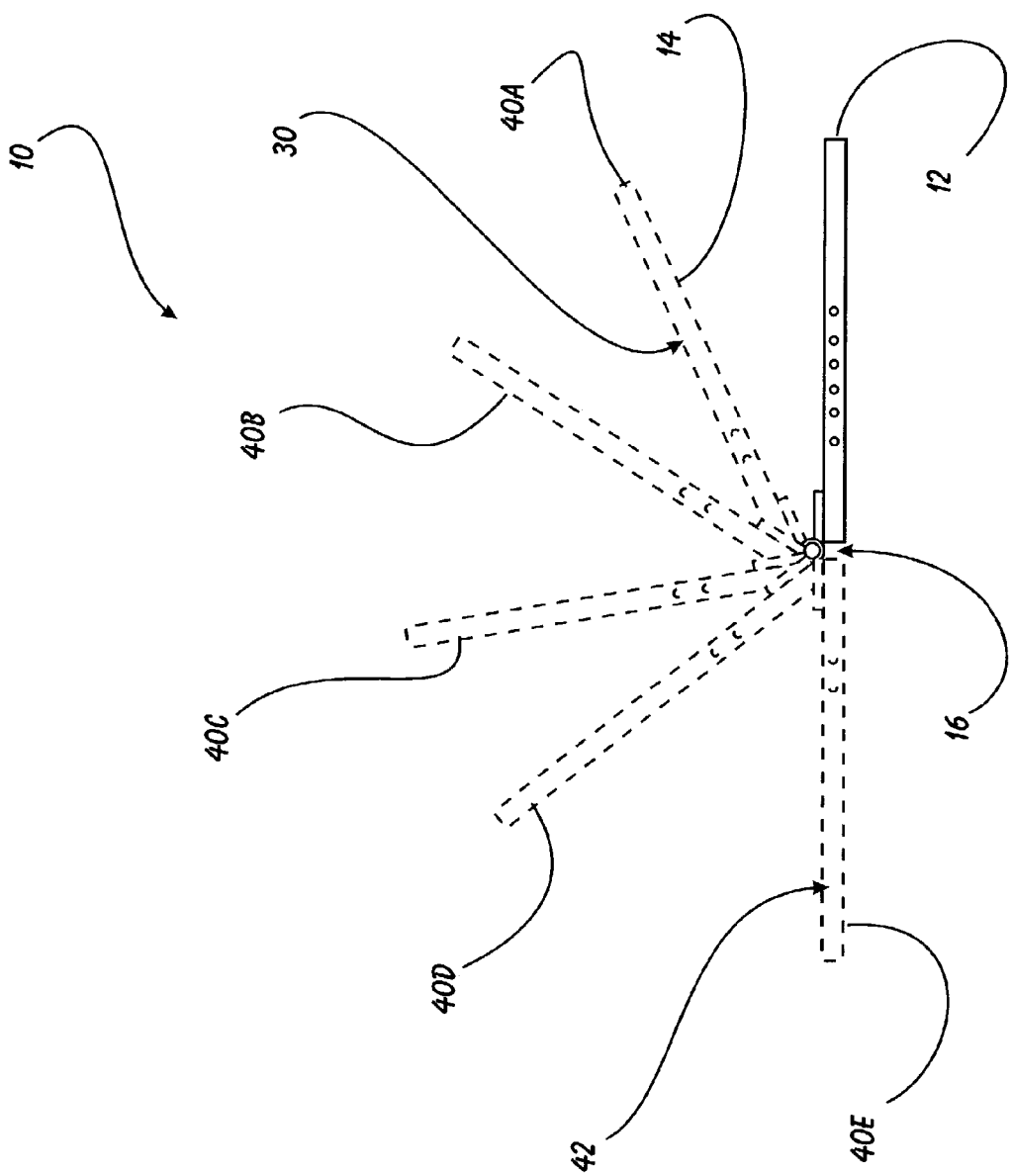
FIG. 3 is a side view of the embodiment of FIGS. 1 and 2.

FIGS. 2A and 2B depict how conventional sexual devices might attach to the structure 10. In FIG. 2A, a sexual device 32 having a suction cup base 34 extending downwardly is depicted. The first inclinable surface 30 is configured such that the suction cup 34 can be stuck thereto to hold the device 32 firmly in place. The inclinable surface 30 can then be adjusted in its incline until the desired orientation is achieved. Similarly, the straps 36 of the alternate sexual device 32A, depicted in FIG. 2B, could be wrapped around the second member 14, such that the alternate base 34A of the device 32A is held securely to the structure 32A. It should be appreciated that these two depictions are simply two examples of potential use methods for the structure 10 and devices in the field of those depicted as 32 and 32A. Turning to FIG. 3, we can examine the present invention in additional detail.

FIG. 3 is a side view of the embodiment 10 of FIGS. 1 and 2. As shown, the second member 14 has virtually an unlimited number of positions; those labeled as 40A through 40E are merely exemplary. The second member 14 is simply held in a particular position 40 by the strut (see FIGS. 1 and 2) extending between the first and second members 12 and 14, respectively. In fact, it is possible that the second inclinable surface 42 (the "bottom-side" of the second member 14) be positioned such that it might be used as a surface to which the sexual device (see FIG. 2) could be attached. If FIG. 4 is now examined, we can discuss an alternate form of the structure of the present invention.

Figure 4:
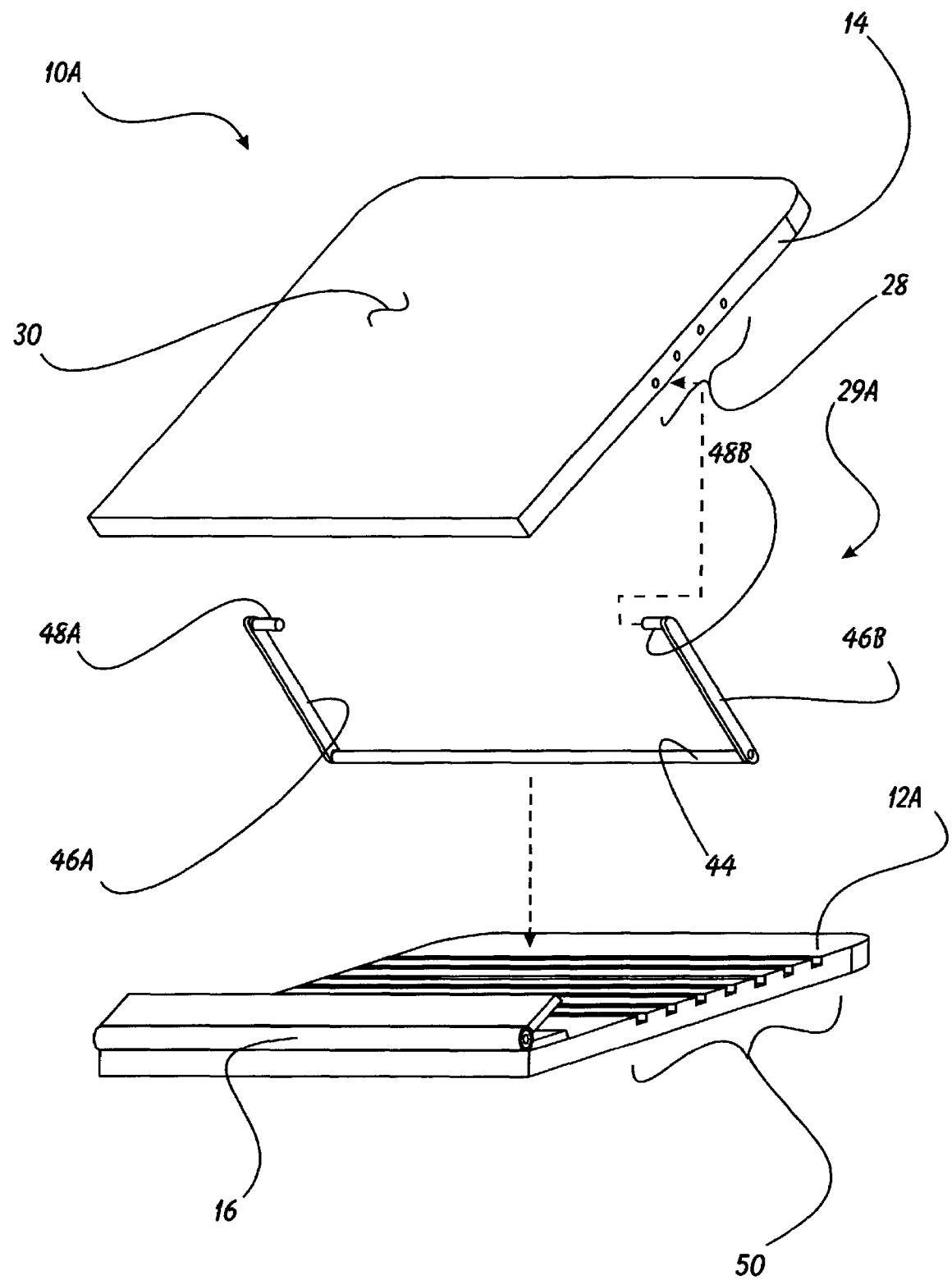
FIG. 4 is an exploded perspective view of an alternate embodiment of the device of the present invention.

FIG. 4 is an exploded perspective view of an alternate embodiment 10A of the device of the present invention. As shown, the second member 14 is essentially unchanged, and is defined by at least a first inclinable surface 30 and one or more apertures 28. The strut and first member have been changed fairly substantially, however.

The alternate strut 29A here comprises a center portion 44 terminating at its two ends in first and second arm portions 46A and 46B, respectively. The arms 46A, 46B extend substantially perpendicularly to the center portion 44, and terminate at their distal ends in first and second tips 48A and 48B, respectively. The tips 48A, 48B are configured to cooperate with the apertures 28, such that the strut can be attached pivotally to the second member via these tips and apertures.

The alternate first member 12A here includes one or more grooves 50 disbursed along the upper surface of the member 12A. These grooves 50 are configured to accept the center portion 44 (and the ends of the arm portions 46) therein to securely prevent the strut 29A from slipping. The result is a brace that hase substantial flexibility in positioning the second member (i.e. it's incline). Furthermore, the strut 29A can be folded flat against the first and second members 12 and 14, so as to provide an extremely compact package. Finally turning to FIG. 5, we can examine another unique and useful feature of the present invention.

Figure 5:
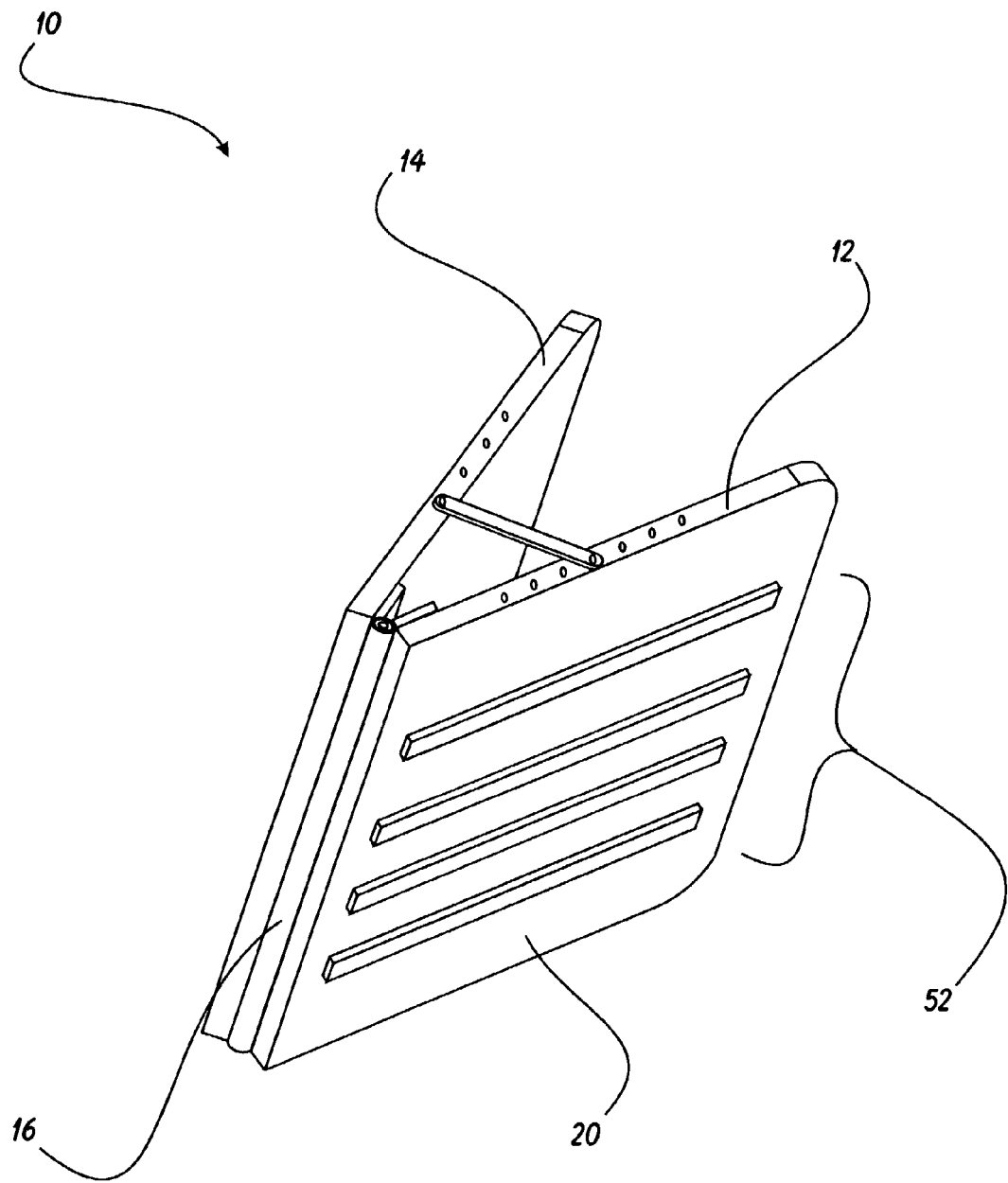
FIG. 5 is a bottom perspective view of the device of the present invention.

FIG. 5 is a bottom perspective view of the device 10 (or 10A) of the present invention. In order to prevent slippage, it may be desirable to attach, embed or otherwise dispose one or more skid-resistant elements 52 along the bottom surface 20 of the first member 12. These elements 52 may be thin strips of material, as shown, or they might be one or more large sheets of material. The material might be a rubbery material that prevents slippage on hard surfaces, or it might be made from hook-and-loop fasteners that can interact with either another set of hook-and-loop fasteners, or with carpeted flooring. Other devices might also be deployed that have the purpose of fixing the structure 10 in place on whatever surface in which it rests.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A sexual device and support structure combination, comprising:
   a sexual device comprising a base and a operative portion extending therefrom;
   a support structure comprising a substantially flat inclinable member further comprising a surface for attaching said base thereto, said surface for attaching being substantially smooth and hard and further being absent of appurtenances extending upwardly therefrom, said support structure further comprising a non-inclinable member hingably attached to said inclinable member; inclination means for setting and changing the incline position of said inclinable member, said inclination means comprising a strut extending between said inclinable and said non-inclinable members.

2. The combination of claim 1, wherein said base is further defined by a suction cup, said sexual device attaching to said surface operation of said suction cup.

3. The combination of claim 1, wherein said base is further defined by a strap extending therefrom, said sexual device attaching to said inclinable member by attaching said strap to said inclinable member.

4. The combination of claim 1, wherein said strut further comprises a center portion terminating in a pair of arm portions extending from opposing ends thereof; and
   one said member is defined by at least one groove formed therein for accepting said center portion therein.

5. The combination of claim 4, wherein said inclinable and said non-inclinable members are defined by edges, said first member edge having more than one aperture formed therethrough for attaching said strut thereto.

6. The combination of claim 5, wherein said inclinable member edge is further defined by at least one aperture formed therethrough for attaching said strut thereto.

7. The combination of claim 6, wherein said base is further defined by a suction cup, said sexual device attaching to said surface operation of said suction cup.

8. The combination of claim 6, wherein said base is further defined by a strap extending therefrom, said sexual device attaching to said inclinable member by attaching said strap to said inclinable member.

9. The combination of claim 5, wherein said base is further defined by a suction cup, said sexual device attaching to said surface operation of said suction cup.

10. The combination of claim 5, wherein said base is further defined by a strap extending therefrom, said sexual device attaching to said inclinable member by attaching said strap to said inclinable member.

11. The combination of claim 4, wherein said base is further defined by a suction cup, said sexual device attaching to said surface operation of said suction cup.

12. The combination of claim 4, wherein said base is further defined by a strap extending therefrom, said sexual device attaching to said inclinable member by attaching said strap to said inclinable member.

* * * * *